(12) United States Patent
Luiset et al.

(10) Patent No.: US 9,300,684 B2
(45) Date of Patent: Mar. 29, 2016

(54) METHODS AND SYSTEMS FOR STATISTICAL ABERRANT BEHAVIOR DETECTION OF TIME-SERIES DATA

(75) Inventors: Sylvain Luiset, Fribourg (CH); Matthew Thomas, Atlanta, GA (US)

(73) Assignee: VERISIGN, INC., Reston, VA (US)

( * ) Notice: Subject to any disclaimer, the term of this patent is extended or adjusted under 35 U.S.C. 154(b) by 761 days.

(21) Appl. No.: 13/491,425

(22) Filed: Jun. 7, 2012

(65) Prior Publication Data
US 2013/0332109 A1    Dec. 12, 2013

(51) Int. Cl.
G06F 17/18 (2006.01)
H04L 29/06 (2006.01)
H04L 29/12 (2006.01)

(52) U.S. Cl.
CPC ........... *H04L 63/1441* (2013.01); *H04L 61/103* (2013.01); *H04L 61/1511* (2013.01); *H04L 63/14* (2013.01); *H04L 63/145* (2013.01); *H04L 63/1408* (2013.01); *H04L 63/16* (2013.01); *H04L 2463/144* (2013.01)

(58) Field of Classification Search
CPC ............ H04L 63/1408; H04L 63/1441; H04L 63/145; H04L 61/1511; H04L 63/14; H04L 63/16; H04L 63/162; H04L 61/103; G06F 17/18
USPC ......................................................... 702/179
See application file for complete search history.

(56) References Cited

U.S. PATENT DOCUMENTS

| | | | |
|---|---|---|---|
| 7,346,471 B2 | 3/2008 | Chickering et al. | |
| 7,426,634 B2 | 9/2008 | Jain | |
| 7,941,742 B1* | 5/2011 | Hao | G06T 11/206 345/418 |
| 7,992,192 B2 | 8/2011 | Maher et al. | |
| 8,032,867 B2 | 10/2011 | Bansal | |
| 8,089,875 B2 | 1/2012 | Fraccalvieri et al. | |
| 8,566,928 B2* | 10/2013 | Dagon | H04L 29/12066 726/22 |
| 2007/0150949 A1 | 6/2007 | Futamura et al. | |
| 2008/0028463 A1 | 1/2008 | Dagon et al. | |
| 2008/0209552 A1* | 8/2008 | Williams | G06F 21/31 726/22 |
| 2010/0037314 A1 | 2/2010 | Perdisci et al. | |
| 2010/0269168 A1* | 10/2010 | Hegli | G06F 21/577 726/11 |
| 2011/0119226 A1 | 5/2011 | Ruhl et al. | |
| 2011/0153603 A1 | 6/2011 | Adiba et al. | |

OTHER PUBLICATIONS

Brutlag, Aberrant Behavior Detection in Time Series for Network Monitoring, Proceedings of the 14th USENIX conference on System administration (LISA '00), Dec. 3-8, 2000 (13 pages).

(Continued)

*Primary Examiner* — John Breene
*Assistant Examiner* — Lynda Dinh
(74) *Attorney, Agent, or Firm* — MH2 Technology Law Group, LLP

(57) ABSTRACT

Methods and systems for detecting aberrant behavior in time-series observation data, such as non-existent domain data, are disclosed. The methods and systems analyze the time-series observation data to determine time-series prediction data. The time-series observation data and time-series prediction data are used to determine a threshold that is based on the standard deviation of deviation values between the time-series observation data and time-series prediction data. The threshold may be used to detect aberrant behavior in subsequently obtained time-series observation data.

16 Claims, 5 Drawing Sheets

(56) References Cited

OTHER PUBLICATIONS

Zhu, Using Failure Information Analysis to Detect Enterprise Zombies and Network Anomalies, Master's Thesis, Northwestern University, Mar. 2009 (50 pages).

Jake D. Brutlag, "Aberrant Behavior Detection in Time Series for Network Monitoring", Proceeding of the 14th Systmes Administration Conference, (LISA 2000), Dec. 8, 2000, pp. 138-146, https://www.usenix.org/legacy/events/lisa00/full_papers/brutlag/brutlag.pdf, retrieved Sep. 25, 2013.

Maciej Szmit et al., "Usage of Modified Holt-Winters Method in the Anomaly Detection of Network Traffic: Case Studies", Journal of Computer Networks and Communications, vol. 2012, 192913, Mar. 29, 2012, pp. 1-6, http://www.hindawi.com/journals/jcnc/2012/192913/cta/, retrieved on Sep. 26, 2013.

Xuebiao Yuchi et al., "A New Statistical Approach to DNS Traffic Anomaly Detection", Advanced Data Mining and Applications, Springer Berlin Heidelberg, Berlin, Heidelberg, Nov. 19, 2010, pp. 302-313.

Ricardo Villamarin-Salomon et al., "Identifying Botnets Using Anomaly Detection Techniques Applied to DNS Traffic", Consumer Communications and Networking Conference, 2008, CCNC 2008, 5th IEEE, IEEE CCP, Piscataway, NJ, USA, Jan. 12, 2008, pp. 476-481.

Extended European Search Report dated Oct. 9, 2013, European Application No. 13170930.5, filed Jun. 6, 2013, pp. 1-6.

* cited by examiner

METHODS AND SYSTEMS FOR STATISTICAL ABERRANT BEHAVIOR DETECTION OF TIME-SERIES DATA

TECHNICAL FIELD

The present disclosure relates to the field of data analysis and, more particularly, methods and systems for aberrant behavior detection for time-series data.

BACKGROUND

It is often desirable to analyze time-series data for anomalies. For example, time-series data may be analyzed to monitor stock exchange data or data recorded in logs reflecting traffic through firewalls or telephone systems. Such analysis may also be used in detection of "malware." Malware, short for "malicious software," is software that is designed for hostile or intrusive purposes. For example, malware may be designed with the intent of gathering confidential information, denying or disrupting operations, accessing resources without authorization, and other abusive purposes. Types of malware include, for example, computer viruses, worms, Trojan horses, spyware, adware, and botnets. Malware developers typically distribute their software via the Internet, often clandestinely. As Internet use continues to grow around the world, malware developers have more incentives for releasing such software.

Botnets are one example of malware that have become a major security threat in recent years. A botnet is a network of "innocent" host computers that have been infected with malicious software in such a way that a remote attacker is able to control the host computers. The malicious software used to infect the host computers is referred to as a "bot," which is short for "robot." Botnets operate under a command and control (C&C) architecture, where a remote attacker is able to control the infected computers, often referred to as "zombie" computers. An attacker may control the infected computers to carry out online anti-social or criminal activities, such as e-mail spam, click fraud, distributed denial-of-service attacks (DDoS), or identity theft.

FIG. 1 illustrates an exemplary C&C architecture of a botnet 100. The botnet master 101, often referred to as a "botmaster" or "bot herder," distributes malicious bot software, typically over the Internet 102. This bot software stores an indication of a future time and of domain names to contact at the indicated future time. The bot software infects a number of host computers 103 causing them to become compromised. Users of host computers 103 typically do not know that the bot software is running on their computers. Botnet master 101 also registers temporary domain names to be used as C&C servers 104. Then, at the indicated future time, the bot software instruct host computers 103 to contact C&C servers 104 to get instructions. The instructions are sent over a C&C channel via the Internet 102. The ability to send instructions to host computers 103 provides botnet master 101 with control over a large number of host computers. This enables botnet master 101 to generate huge volumes of network traffic, which can be used for e-mailing spam messages, shutting down or slowing web sites through DDoS attacks, or other purposes.

Botnets exploit the domain name system (DNS) to rally infected host computers. The DNS allows people using the Internet to refer to domain names, rather than Internet Protocol (IP) addresses, when accessing websites and other online services. Domain names, which employ text characters, such as letters, numbers, and hyphens (e.g., "www.example.com"), will often be easier to remember than IP addresses, which are numerical and do not contain letters or hyphens (e.g., "128.1.0.0"). In addition, a domain name may be registered before an IP address has been acquired. The DNS is the Internet's hierarchical lookup service for mapping character-based domain names meaningful to humans into numerical IP addresses.

Botnets exploit the DNS by registering domain names to be temporarily used as C&C servers 104. However, a botnet master will often distribute bot software before registering the domains indicated in the bot software. By the time bot software instructs host computers 103 to contact C&C servers 104, the bot master 101 will often have only registered a subset of the domains indicated in the bot software. Thus, when bot software instructs host computers 103 to contact C&C servers 104, host computers 103 will often attempt to contact a number of unregistered domains.

Legitimate internet user activity will include a mixture of requests for existent domains (YXDs) and non-existent domains (NXDs). In addition, legitimate internet user activity will have a periodic nature such that activity is, on average, higher at some predictable times and lower at other predictable times (e.g., an internet user may be more active during the day than during the night, and may be more active during weekdays than during weekends). Because of the periodic nature of a typical internet user's activity, an examination of NXD data will often reveal a predictable pattern over one or more periods of time.

Illegitimate internet use, such as by host computers 103 in botnet 100, will also include a mixture of requests for YXDs and NXDs. However, because a botnet master 101 will typically only register a small subset of the domain names that it provides in the bot software, after host computers 103 attempt to access the C&C servers 104 a spike in the overall quantity of NXDs will arise that deviates from the predictable periodic nature of legitimate internet user activity.

SUMMARY

In one disclosed embodiment, a computer-implemented method for detecting aberrant behavior in time-series data is performed. The method includes obtaining first time-series observation data. The method further includes determining time-series prediction data representative of a predicted trend of the first observation data. The method further includes determining a standard deviation value representative of a deviation between the first observation data and the prediction data. The method further includes determining a threshold based, at least in part, on the standard deviation value. The method further includes detecting aberrant behavior in second time-series observation data based, at least in part, on the threshold.

In another disclosed embodiment, a system for detecting aberrant behavior in time-series data is provided. The system includes a processor, a memory, and program code stored on the memory, which, when executed by the processor, causes the system to obtain first time-series observation data, determine time-series prediction data representative of a predicted trend of the first observation data, determine a standard deviation value representative of a deviation between the first observation data and the prediction data, determine a threshold based, at least in part, on the standard deviation value, and detect aberrant behavior in second time-series observation data based, at least in part, on the threshold.

Additional aspects related to the embodiments will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
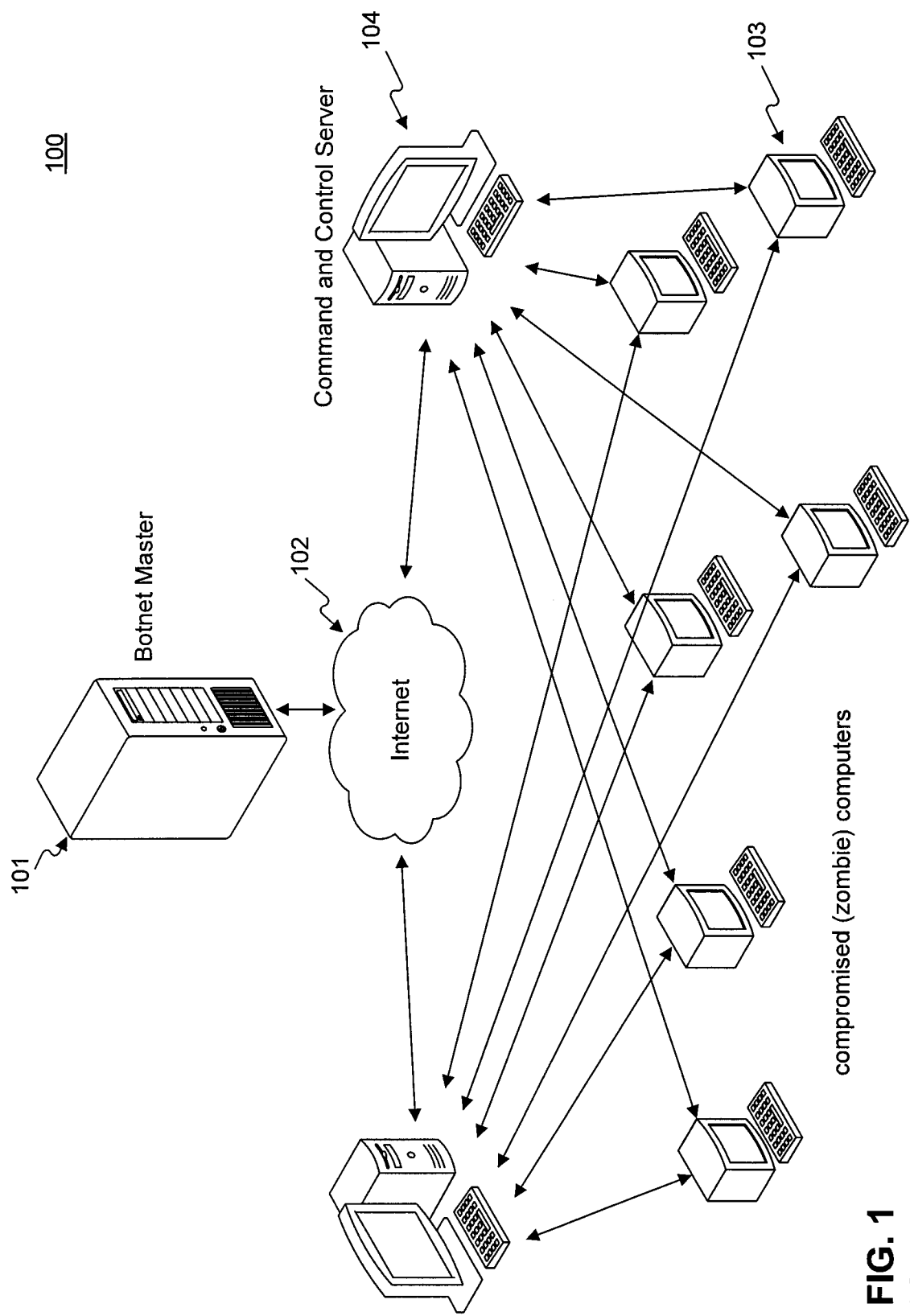
FIG. 1 illustrates a command and control network architecture of a botnet.
Figure 2:
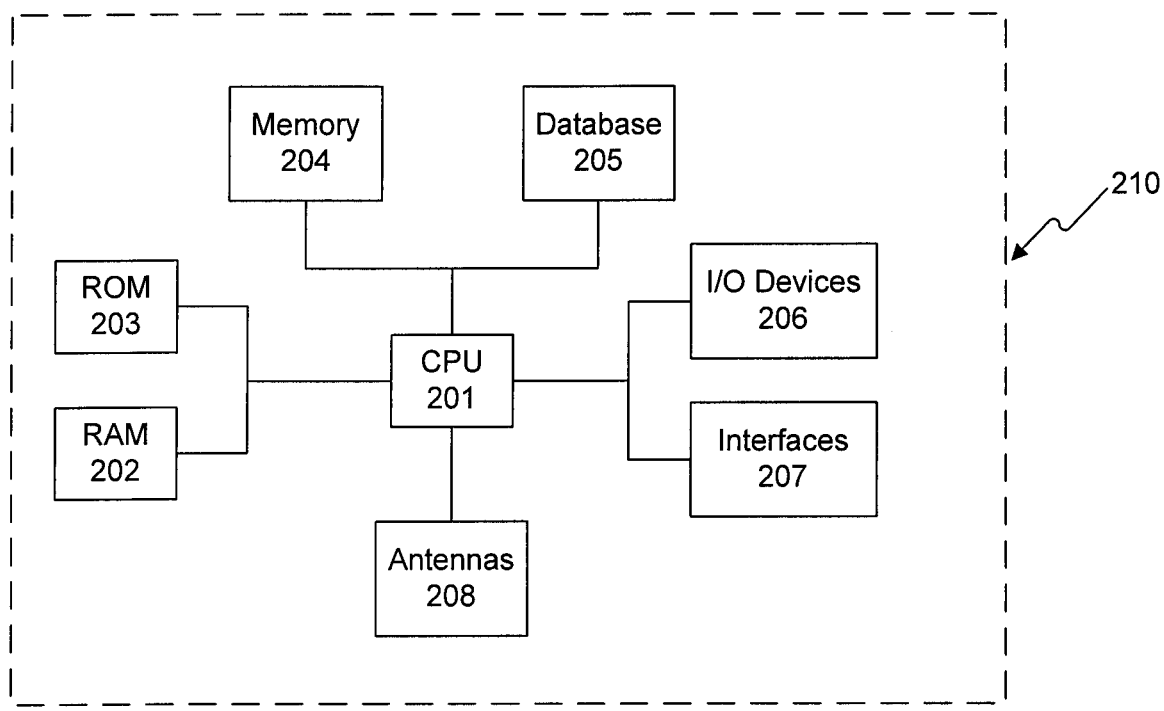
FIG. 2 illustrates an exemplary system that may be used for implementing the disclosed embodiments.

FIG. 2 is a diagram illustrating an exemplary computer system 200 that may be used for implementing the disclosed embodiments.

Computer system 200 may include one or more computers 210, which may be servers, personal computers, and/or other types of computing devices. Computer 210 may include, among other things, one or more of the following components: a central processing unit (CPU) 201 configured to execute computer program code to perform various processes and methods, including the embodiments herein described; tangible non-transitory computer-readable memory such as random access memory (RAM) 202 and read only memory (ROM) 203 configured to access and store information and computer program code; memory 204 to store data and information; database 205 to store tables, lists, or other data structures; I/O devices 206; interfaces 207; and antennas 208. Each of these components is well-known in the art and will not be discussed further.

Figure 3:
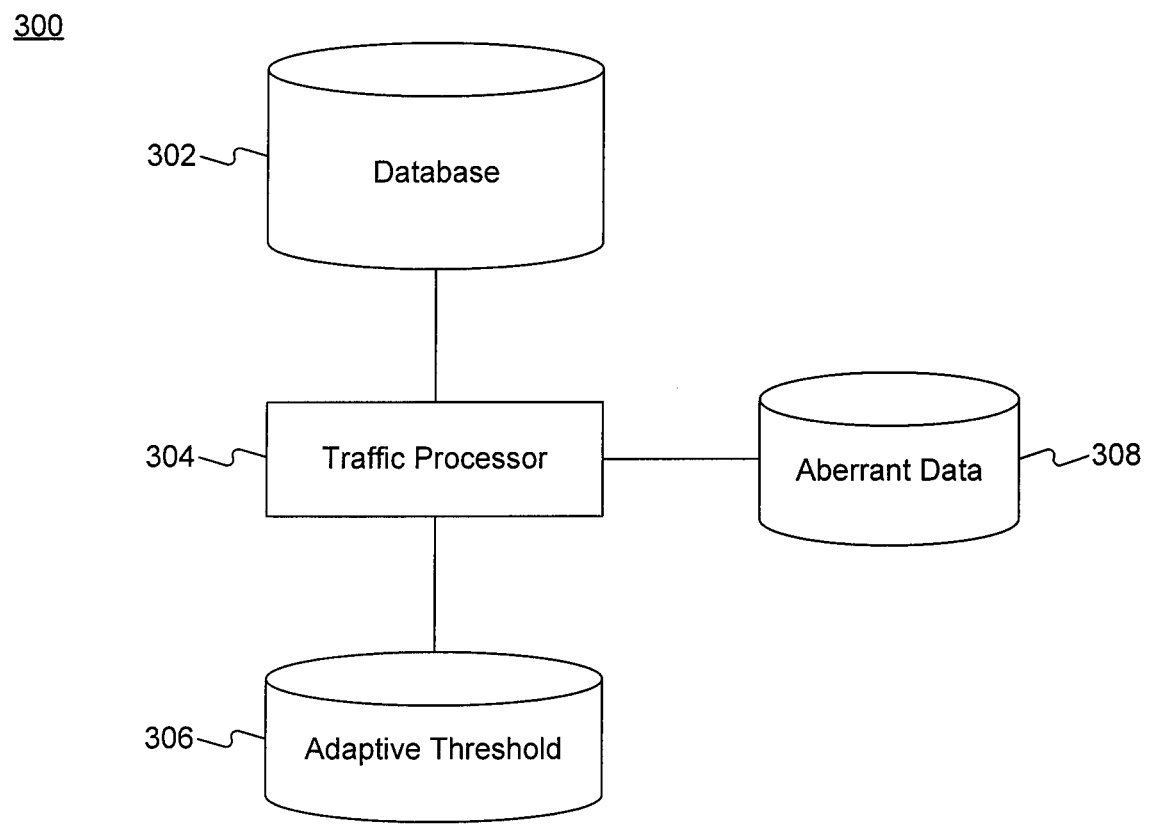
FIG. 3 illustrates an exemplary system that may be used for implementing the disclosed embodiments.

FIG. 3 illustrates an exemplary DNS traffic analyzing system 300.

System 300 may include a traffic processor 304, which may be a CPU 201, a computer 210, or any other device capable of processing data. Traffic processor 304 may obtain time-series data such as DNS lookup data from a database 302. Database 302 may be associated with DNS servers, and database 302 may contain DNS lookup data concerning DNS queries. For example, the DNS lookup data may include time-series data regarding queries for non-existent domains (NXDs).

In some embodiments, database 302 may be a round-robin database. In a round-robin database, several layers may exist, such that data from one layer may be aggregated and archived in another layer. A round-robin database allows for the total storage size to be limited. In addition, a round-robin allows for analysis of the DNS lookup data to be performed at different levels of abstraction based on which archive layer is selected for analysis. In alternative embodiments, a traditional database may also be used to store the DNS lookup data.

Based on the DNS lookup data, traffic processor 304 may determine an adaptive threshold 306. The adaptive threshold 306 may be used by traffic processor 304 to generate aberrant data 308. Aberrant data 308 may provide an indication that portions of the DNS lookup data exhibit aberrant and/or non-aberrant behavior.

Figure 4:
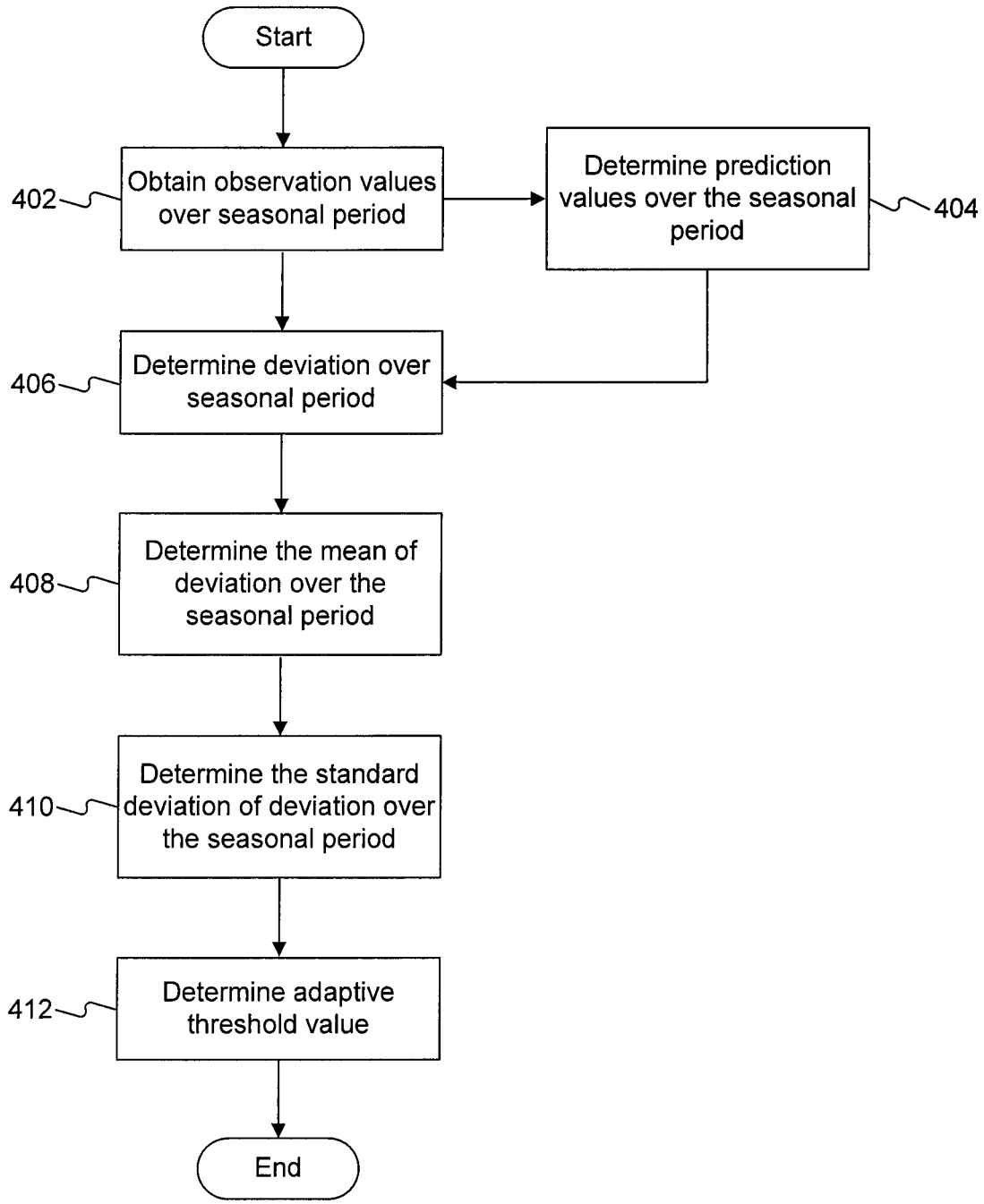
FIG. 4 illustrates an exemplary method for determining an adaptive threshold.

FIG. 4 illustrates an exemplary method 400 for determining an adaptive threshold.

In method 400, observation values are obtained over a period, such as a seasonal period (step 402). In some embodiments, the seasonal period is representative of an amount of time over which one approximately repeating cycle occurs. For example, in embodiments where the observation values are obtained from DNS lookup data that includes time-series data regarding queries for NXDs, a seasonal period may be one day or one week in order to account for the approximately repeating behavior of legitimate internet user activity over the course of a day or week.

In some embodiments, the observation values are obtained from DNS lookup data that includes time-series data regarding queries for NXDs. In such embodiments, an observation value at time t may represent the number of queries for NXDs that occurred between time t−1 and time t. In embodiments where a round-robin database is used to store DNS lookup data, the time between observation values will depend upon the archive layer selected for analysis. For example, if the selected seasonal period is one week, an archive layer may be selected such that the time between observation values is one hour; in contrast, if the selected seasonal period if one day, an archive layer may be selected such that the time between observation values is one minute.

The observation values may also be grouped based on other factors, such as geographic location or time zone, that would increase the predictability of legitimate internet activity. For example, two internet users within the same time zone are more likely to be using the internet at the same time than two internet users that are not within the same time zone. By grouping observation values in this way, deviations from legitimate internet activity may be more apparent.

The observation values are used to determine prediction values over the seasonal period (step 404). An initial prediction value will be set for time 1. For example, the initial prediction value may be set as being equal to the observation value at time 1. Subsequent prediction values may be determined using an exponential smoothing technique. For example, the prediction at time t may be calculated by determining a weighted average of the observation at time t−1 and the prediction at time t−1.

Once observation and prediction values are obtained over a seasonal period (i.e., observation values are obtained for time 1 to t and prediction values are obtained for time 1 to t), the method 400 may determine deviation values over the seasonal period (step 406). A deviation value at a given time t may be calculated by applying an exponential smoothing technique (e.g., a Holt-Winters technique) to the difference between the observation value at the given time t and the prediction value at the given time t. For example, the deviation value at a given time t may be calculated using the formula $g_t = \epsilon \cdot |y_t - \hat{y}_t| + (1-\epsilon) \cdot g_{t-1}$, where $g_t$ is the deviation at time t, $y_t$ is the prediction at time t, $\hat{y}_t$ is the observation at time t, and $\epsilon$ is a weighting parameter.

Once deviation values are obtained over a seasonal period (i.e., deviation values are obtained for time 1 to t), the method 400 may determine the mean of the deviation values over the seasonal period (step 408). Then, using the deviation values determined in step 406 and the mean determined in step 408, the method 400 may determine the standard deviation of the deviation values over the seasonal period (step 410).

The standard deviation may be used to derive an adaptive threshold value (step 412). In some embodiments, the adaptive threshold will be determined by first determining the percentage of deviation values that are to be considered non-aberrant. Using Chebyshev's inequality, the number of standard deviations to satisfy the desired percentage may be calculated. Chebyshev's inequality provides that, for a random variable X with mean μ and standard deviation σ, the probability of [X–μ] being less than k times σ will be greater than or equal to $1-1/k^2$, for any value k>0. Thus, the adaptive threshold may be set to equal k multiplied by the standard deviation, where k is determined by finding a value for k that would cause $1-1/(k^2)$ to equal, or approximately equal, the desired percentage of non-aberrant deviation values. For example, if at least 93.75% of deviation values should be non-aberrant, the adaptive threshold may be set to equal 4 times the standard deviation, since $1-1/(4^2)$ is equal to 0.9375, or 93.75%.

Figure 5:
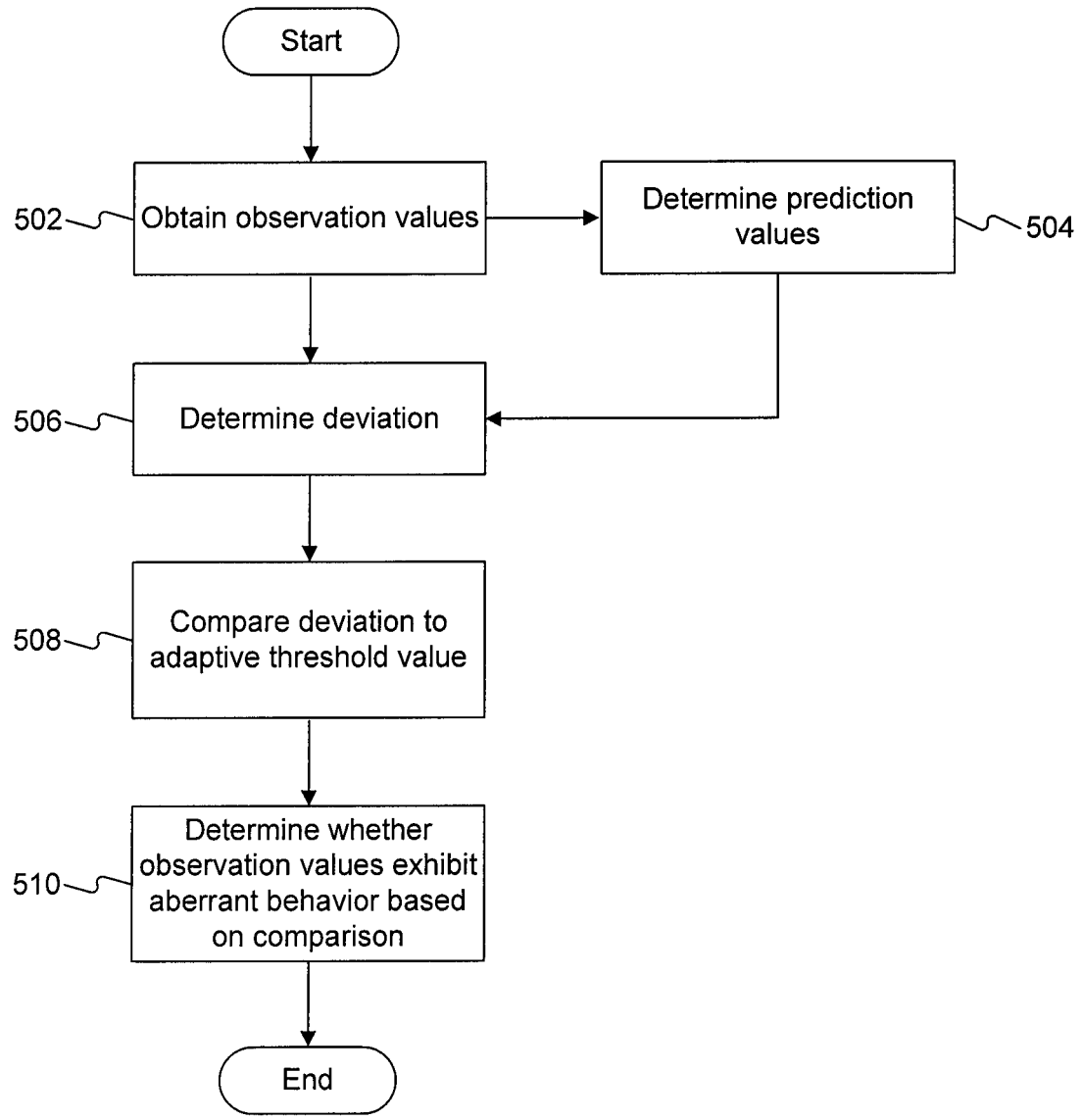
FIG. 5 illustrates an exemplary method for determining that time-series data exhibits aberrant behavior.

FIG. 5 illustrates an exemplary method for determining that time-series data exhibits aberrant behavior by utilizing an adaptive threshold.

In method 500, observation values are obtained (step 502). The observation values that are obtained are used to determine prediction values (step 504). The obtained observation values and determined prediction values of method 500 have the same characteristics as described above in regards to the obtained observation values and determined prediction values of method 400. However, whereas method 400 waits to obtain observation values over a seasonal period, some embodiments of method 500 may be performed in real time as observation values are being obtained.

Once observation and prediction values are obtained (though not necessarily for an entire seasonal period), the method 500 may determine deviation values (step 506). As described above in regards to step 406 of method 400, a deviation value at a given time t may be calculated by applying an exponential smoothing technique.

Deviation values are then compared to the adaptive threshold value (step 508). Based on this comparison, a determination will be made as to whether the obtained observation values exhibit aberrant behavior (step 510). For example, when a deviation value is greater than the adaptive threshold value, a determination may be made that the time-series data is exhibiting aberrant behavior. Alternatively, when a deviation value is not greater than the adaptive threshold value, a determination may be made that the time-series data is not exhibiting aberrant behavior.

When the time-series data is NXD data, an aberrant behavior determination may provide an indication that botnet activity exists. This is because, as discussed above, botnets cause a spike in NXD data. Thus, a spike in NXD data that causes a deviation value to exceed the threshold value provides an indication of botnet activity.

In some embodiments, an additional requirement may be imposed that a predetermined number of deviations values greater than the adaptive threshold value be found before a determination is made that the time-series data is exhibiting aberrant behavior. By imposing such a requirement, fewer false-positive determinations of aberrant behavior would be detected, but also fewer correct determinations of aberrant behavior would be detected.

In some embodiments, a new threshold value, to be used with a subsequent set of time-series data, may be calculated using the new set of time-series data in the manner described above in regards to method 400. In other words, in some embodiments, each set of time series-data may be analyzed with the threshold calculated from the previous set of time-series data and used to calculate a new threshold. However, in some embodiments, the same threshold value could be used for multiple sets of time-series data before an updated threshold value is calculated.

Other embodiments will be apparent to those skilled in the art from consideration of the specification and practice of the invention disclosed herein. It is intended that the specification and examples be considered as exemplary only, with a true scope and spirit of the invention being indicated by the following claims. Further, it should be understood that, as used herein, the indefinite articles "a" and "an" mean "one or more" in open-ended claims containing the transitional phrase "comprising," "including," and/or "having."

What is claimed is:

1. A computer-implemented method for detecting aberrant behavior in time-series data, comprising:
   obtaining, via one or more processors, from a database associated with a Domain Name System (DNS) server, first time-series observation data;
   storing, via the one or more processors, in a round robin database and as an entry in a first layer of the round robin database, a first value corresponding to a number of queries that occurred during a first time interval of a first length, wherein each entry in the first layer of the round robin database corresponds to a time interval of the first length;
   storing, via the one or more processors, in the round robin database and as an entry in the first layer of the round robin database, a second value corresponding to a number of queries that occurred during a second time interval of the first length;
   storing, via the one or more processors, in the round robin database and as an entry in a second layer of the round robin database, a third value corresponding to a number of queries that occurred during a third time interval of a second length larger than the first length, wherein:
      each entry in the second layer of the round robin database corresponds to a time interval of the second length;
      the third value comprises an aggregation of the first value and the second value; and
      the third time interval comprises the first time interval and the second time interval;
   determining, via the one or more processors and using entries in the second layer of the round robin database, time-series prediction data representative of a predicted trend of the first time-series observation data;
   determining, via the one or more processors, a standard deviation value representative of a deviation between the first time-series observation data and the time-series prediction data;
   determining, via the one or more processors, a threshold based, at least in part, on the standard deviation value; and
   detecting, via the one or more processors, aberrant behavior corresponding to malicious software in second time-series observation data by:
      determining second time-series prediction data representative of a predicted trend of the second time-series observation data;
      determining second time-series deviation data between the second time-series observation data and the second time-series prediction data; and comparing one or more values of the second time-series deviation data with a threshold;
replacing the threshold with an updated threshold based, at least in part, on the second time-series observation data; and
providing, via one or more input/output (I/O) devices, an indication that botnet activity exists based on detecting the aberrant behavior corresponding to malicious software.

2. The method of claim 1, wherein the first time-series observation data is representative of queries for non-existent domains.

3. The method of claim 2, wherein providing the indication that botnet activity exists is in response to detecting the first time-series observation data is representative of queries for non-existent domains.

4. The method of claim 1, wherein the determining the time-series prediction data further comprises applying an exponential smoothing technique to the first time-series observation data.

5. The method of claim 1, wherein the determining the standard deviation value further comprises:
   determining time-series deviation data between the first time-series observation data and the time-series prediction data;
   determining the mean of the time-series deviation data; and
   determining the standard deviation value by analyzing the time-series deviation data and the mean.

6. The method of claim 5, wherein the determining the time-series deviation data further comprises applying an exponential smoothing technique to differences between the first time-series observation data and the time-series prediction data.

7. The method of claim 1, wherein the detecting aberrant behavior in the second time-series observation data further comprises determining that a predetermined number of values of the second time-series deviation data exceed the threshold.

8. The method of claim 1, further comprising:
   detecting aberrant behavior in third time-series observation data based, at least in part, on the updated threshold.

9. A system for detecting aberrant behavior in time-series data, comprising:
   one or more processors;
   one or more memory;
   one or more input/output (I/O) devices; and
   program code stored on the one or more memory, which, when executed by the one or more processors, causes the system to perform operations comprising:
      obtaining, from a database associated with a Domain Name System (DNS) server, first time-series observation data;
      storing, in a round robin database and as an entry in a first layer of the round robin database, a first value corresponding to a number of queries that occurred during a first time interval of a first length, wherein each entry in the first layer of the round robin database corresponds to a time interval of the first length;
      storing, in the round robin database and as an entry in the first layer of the round robin database, a second value corresponding to a number of queries that occurred during a second time interval of the first length;
      storing, in the round robin database and as an entry in a second layer of the round robin database, a third value corresponding to a number of queries that occurred during a third time interval of a second length larger than the first length, wherein:
         each entry in the second layer of the round robin database corresponds to a time interval of the second length;
         the third value comprises an aggregation of the first value and the second value; and
         the third time interval comprises the first time interval and the second time interval;
      determining, using entries in the second layer of the round robin database, time-series prediction data representative of a predicted trend of the first time-series observation data;
      determining a standard deviation value representative of a deviation between the first time-series observation data and the time-series prediction data;
      determining a threshold based, at least in part, on the standard deviation value; and
      detecting aberrant behavior corresponding to malicious software in second time-series observation data by:
         determining second time-series prediction data representative of a predicted trend of the second time-series observation data;
         determining second time-series deviation data between the second time-series observation data and the second time-series prediction data; and
         comparing one or more values of the second time-series deviation data with a threshold;
      replacing the threshold with an updated threshold based, at least in part, on the second time-series observation data; and
      providing, via the I/O devices, an indication that botnet activity exists based on detecting the aberrant behavior corresponding to malicious software.

10. The system of claim 9, wherein the first time-series observation data is representative of queries for non-existent domains.

11. The system of claim 10, wherein providing the indication that botnet activity exists is in response to detecting the first time-series observation data is representative of queries for non-existent domains.

12. The system of claim 9, wherein the determining the time-series prediction data further comprises applying an exponential smoothing technique to the first time-series observation data.

13. The system of claim 9, wherein the determining the standard deviation value further comprises:
   determining time-series deviation data between the first time-series observation data and the time-series prediction data;
   determining the mean of the time-series deviation data; and
   determining the standard deviation value by analyzing the time-series deviation data and the mean.

14. The system of claim 13, wherein the determining the time-series deviation data further comprises applying an exponential smoothing technique to differences between the first time-series observation data and the time-series prediction data.

15. The system of claim 9, wherein the detecting aberrant behavior in the second time-series observation data further comprises determining that a predetermined number of values of the second time-series deviation data exceed the threshold.

16. The system of claim 9, wherein the operations further comprise: detecting aberrant behavior in third time-series observation data based, at least in part, on the updated threshold.

* * * * *